United States Patent

[11] 3,613,737

| [72] | Inventor | Werner Peter Schoening<br>10906 Green Arbor, Harris, Tex. 77012 |
|---|---|---|
| [21] | Appl. No. | 797,919 |
| [22] | Filed | Feb. 10, 1969 |
| [45] | Patented | Oct. 19, 1971 |

[54] METHOD AND SYSTEM FOR INSULATING PIPES
7 Claims, 9 Drawing Figs.

[52] U.S. Cl. .................................................. 138/149
[51] Int. Cl. .................................................. F16l 9/14
[50] Field of Search ........................................ 138/111,
113, 129, 131, 140, 148, 149; 28/72

[56] References Cited
UNITED STATES PATENTS

| 2,330,966 | 10/1943 | Gottwald et al. ............. | 138/149 |
| 2,410,308 | 10/1946 | Scharwath ..................... | 138/149 |
| 3,160,143 | 12/1964 | Gray ............................ | 28/72 X |
| 3,191,631 | 6/1965 | Smart ........................... | 138/129 |
| 3,320,649 | 5/1967 | Nainer .......................... | 28/72 |

Primary Examiner—Louis K. Rimrodt
Attorney—Johan Bjorksten

ABSTRACT: A method and system for insulating pipes comprising a tubular sheath of reinforced plastic film which is supported by a helical wire stiffener which encompasses the pipe. A space between the sheath and pipe is filled with insulating material. The sections of the sheath correspond to the length of the pipe and can be readily attached to the adjoining sheath section. This system can be easily adapted to serve the function of temperature regulation of the pipes by employing a hose-type structure for the helical supporting member of the sheath which allows the circulation of liquids.

PATENTED OCT 19 1971 3,613,737

METHOD AND SYSTEM FOR INSULATING PIPES

FIELD

This invention relates to a method and system for insulating pipes, and more specifically to a prefabricated tubular structure of reinforced plastic film for insulating pipes.

Large plants today incur major expenses in applying insulation to their pipe installations. Various ways to insulate pipes are known, but the main expense is the labor cost involved. There are special ways known to insulate pipe lines continuously by machine if the pipes are already installed. Installation of ells, tees, valves, etc., are not compatible with any of the systems known to prior art for continuous insulation.

OBJECTS

An object of this invention is a method of insulating pipes which reduces labor costs and which permits rapid installation.

Another object is a system of pipe insulation in which a tubular helically supported sheath of reinforced plastic film surrounds the pipe and the space between the sheath is filled with insulating material.

A further object is an insulating system which regulates the temperature of the pipe contained therein.

Further objects will become apparent as the following detailed description proceeds.

SUMMARY

In accordance with my invention, I encompass a pipe with a flexible spiral tubing of reinforced plastic film, allowing for a space between the pipe and tubing. The tubing is concentrically positioned about the pipe by spacing means. The sections of tubing are connected together by any suitable quick-coupling means. Insulation material is then introduced into the space between the tubing and the pipe.

DRAWINGS

With particular reference to the drawings.

Figure 1:
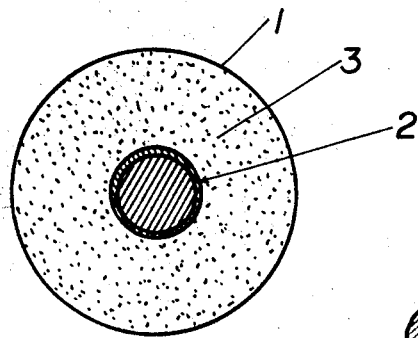
FIG. 1 is a cross-sectional view of the insulation system.
Figure 2:
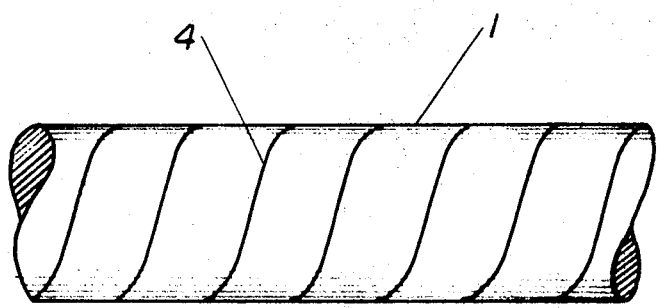
FIG. 2 is a side view of the insulation system.

The sheath, or peripheral tubing as it may be referred to, comprises a substantially hollow cylindrical form of reinforced plastic film 1 supported by a helical wire stiffener 4 as shown in FIG. 2. Due to the flexible characteristics of the sheath it can be compressed lengthwise so that its length is about 1–15 percent of what it is in its extended form. The sheath is then slipped over a pipe 2 during installation in its compressed form. After the installation of the pipe, the sheath is pulled out so as to cover the pipe.

Figure 3:
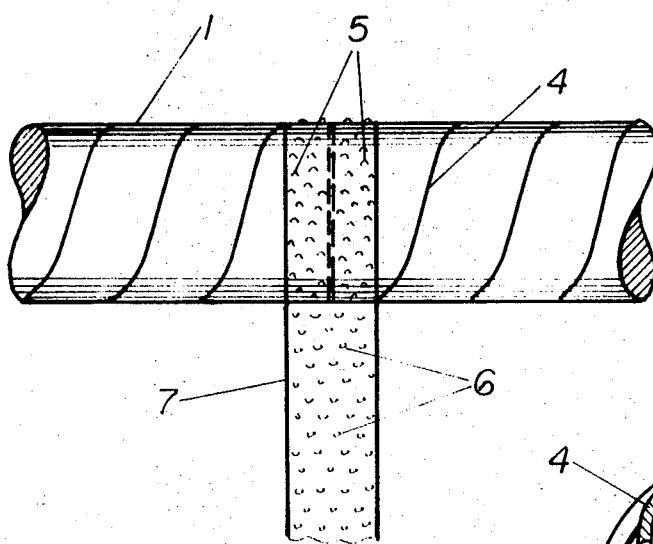
FIG. 3 is a side view of a method of fastening sections of the insulation sheath together.
Figure 5:
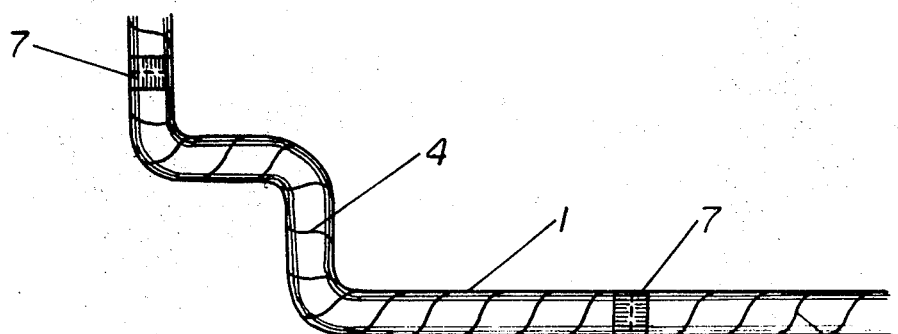
FIG. 5 depicts from a side view an embodiment of the invention.

The sections of the sheath are then fastened to each other to form an integral structure. The means for connecting the sections can be any known quick-coupling means. The preferred coupling means are shown in FIG. 3 and FIG. 5, in which the outer surface of the area extending from ½–2 inches from the end of the sheath is a band of fiber loops 5. A strip 7 of the same material as the sheath with fiber hooks 6 on the inside surface is wrapped around the ends being joined. The hooks "hook-on" to the loops and the sections of the sheath are thus joined together.

Figure 8:
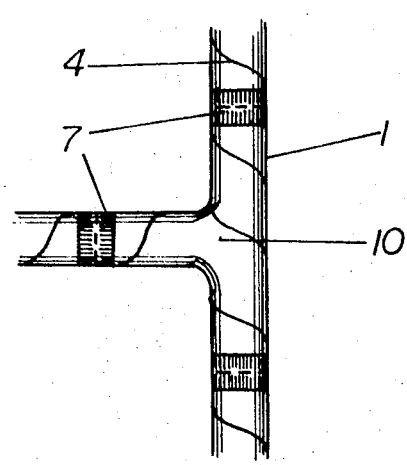
FIG. 8 is a perspective view of an embodiment of the invention.

The system for insulating pipe joints is shown in FIG. 8. To insulate a T-shaped joint, a special section of sheath 10 which corresponds to the shape of the joint is slipped over one of the pipes which will be joined with others to form the joint. The other pipes are slipped into the corresponding branches or sleeves of the sheath and then fitted together with the other pipes to form the joint. Since the special sheath can be compressed in the same manner as the regular sections of sheath, the pipes can be easily fitted together without the sheath interfering. After the joint has been completed, the compressed T-shaped sheath can be extended and fastened to other sheath sections in the manner used to join regular sheath sections together. This system can be broadened to include not only T-shaped joints, but also $n$-joints, where $n$ denotes the number of branches or pipes leading away from the joint. In such a case, the sheath is made with $n$-number of sleeves.

After the entire sheath has been joined together, insulating material 3 is introduced into the space between the pipe and the sheath. This can be accomplished in several ways: blowing with compressed air, spraying, packing by hand, or any other suitable method. The amount of insulation required around the pipe determines the diameter of the sheath. For example, if 1 inch of insulation is required around a 2-inch pipe, it can easily be seen that a sheath with a 4-inch diameter is needed. The insulating material could be, for example, an inorganic nonmetallic fiber, or any other suitable insulating material.

Figure 6:
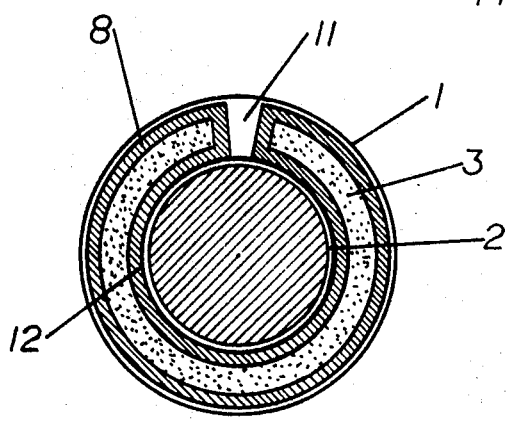
FIG. 6 and 7 are cross-sectional views of an embodiment of the spacing means.
Figure 7:
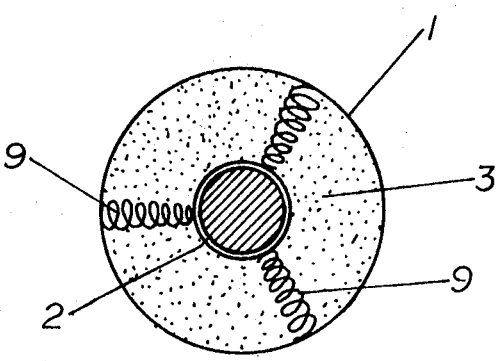

Embodiments of the spacing means heretofore mentioned are illustrated in FIGS. 6 and 7. In FIG. 6 a circular-type spacer 8 is employed. This spacer has a ring 12 which surrounds the pipe and which slipped over the pipe through the opening 11 in the ring. This opening extends the necessary distance from the pipe to the sheath, then curves outward to form a larger concentric circle around the pipe and in turn supports the sheath. This type of spacer could be made of, for example, cardboard or metal foil or plastic sheeting, or any other material stiff enough to support the sheath, but flexible enough to push over the pipe.

Another possible embodiment of the spacing means is shown in FIG. 7. Here coiled springs 9 are attached to the inner surface of the sheath 1 which also contact the pipe 2, maintaining uniform distance between the sheath and pipe.

These two types of spacing means are given as examples and any other suitable spacing means which would maintain uniformity in distance between the pipe and sheath, and allow insulation material to pass by could be used.

The reinforced plastic film heretofore mentioned may consist of extrudable plastics such as polyethylene, or other polyolefins; polyvinyl halides, polyamides, polyurethanes, polyesters, and the like.

Figure 9:
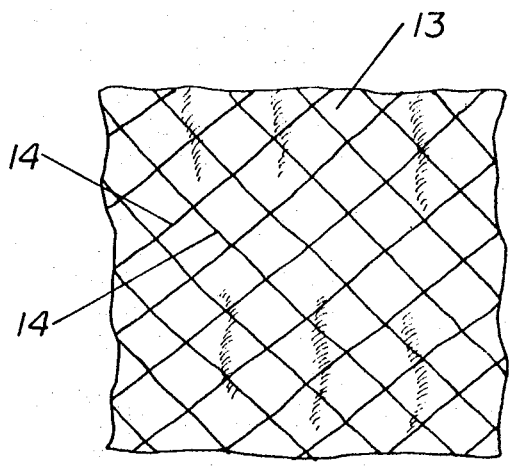
FIG. 9 is a top view of an embodiment of the reinforced plastic film.

The reinforcement comprises ordered parallel groups of fibers of which at least two intersect each other forming polygonal figures such as squares, diamonds, triangles, pentagons and the like, these figures providing anchorage points as well as tear limiting areas preventing the spreading of such puncture damage as may occur. An embodiment of this reinforced plastic film is shown in FIG. 9 in which 13 is the plastic film and 14 is the fibers.

Figure 4:
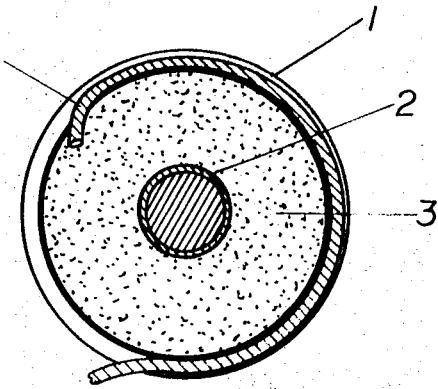
FIG. 4 is a cross-sectional view of an embodiment of the invention with a hose-type supporting member.

A further possible embodiment of the invention is shown in FIG. 4. Here the wire stiffener is a tubing 4 which allows the passage of liquids. By regulating the temperature of the liquid in the tubing, the temperature of the pipe can also be regulated. The tubing can be made of stiff plastic, copper, or any other suitable material.

I claim:

1. An insulated pipe system comprising
   a pipe
     said pipe comprising a plurality of sections of pipe
   a reinforced plastic film sheath surrounding said pipe,
   said sheath being provided with helical supporting wire stiffening means,
   spacing means to position said sheath substantially concentrically around said pipe,
   insulating material between said pipe and said sheath, said sheath comprising attachable sections corresponding to lengths of said sections of the pipe covered thereby, means to attach said sheath sections, said means being a fastener system comprising a ½–2 inch wide band of fiber loops on the outside surface of the ends of each sheath section, and a corresponding strip of the same material as the sheath with fiber hooks on one surface, so that when said strip is wrapped around the ends of two sections of the sheath, the hooks fasten to the loops of both sheath sections.

2. The insulated pipe system of claim 1, in which said insulating helical supporting wire stiffener comprises a liquid-circulating means adaptable to temperature regulation.

3. The insulated pipe system of claim 1, in which said reinforced plastic film sheath comprises plastic film reinforced with ordered parallel groups of fibers of which at least two groups intersect each other, forming polygonal figures, these figures providing anchorage points as well as tear limiting areas which prevent the spreading of puncture damage.

4. The method of providing an insulated pipe system which comprises the steps of:

providing a plurality of sections of pipe, providing a corresponding plurality of sections of sheath of flexible foldable material, each of said sheath sections spirally reinforced with a spiral longitudinally extended member, each of said sheath sections being longitudinally collapsible, longitudinally collapsing each of said sheath sections, installing retaining means to retain each of said sheath sections in its longitudinally collapsed condition, placing one of said sheath sections on each of said pipe sections so that each pipe section is received in a corresponding sheath section, attaching said pipe sections together, removing said retaining means from each of said sheath sections after the pipe section received therein is attached and then uncollapsing or extending said sheath section, providing spacer means to space each sheath section from its corresponding pipe section, and attaching said sheath sections together.

5. The method claim 4 wherein each of said sheath sections is shorter than the pipe section to which it corresponds.

6. The method of claim 4 further characterized by introducing insulating material between said sheath sections and said pipe sections.

7. The method of claim 6 further characterized by introducing said insulating material by blowing it into spaces between said sheath sections and said pipe sections.